(12) United States Patent
Wang et al.

(10) Patent No.: US 8,930,970 B2
(45) Date of Patent: Jan. 6, 2015

(54) METHOD AND COMPUTER FOR OBTAINING USING-FREQUENCY OF APPLICATION PROGRAM

(75) Inventors: Bao-Jian Wang, Shenzhen (CN); Zhong-Xing Hu, Shenzhen (CN); Ying-Hao Zhang, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 0 days.

(21) Appl. No.: 14/128,594

(22) PCT Filed: Sep. 7, 2012

(86) PCT No.: PCT/CN2012/081150
§ 371 (c)(1),
(2), (4) Date: Dec. 20, 2013

(87) PCT Pub. No.: WO2013/044725
PCT Pub. Date: Apr. 4, 2013

(65) Prior Publication Data
US 2014/0130065 A1 May 8, 2014

(30) Foreign Application Priority Data
Sep. 27, 2011 (CN) .......................... 2011 1 0296513

(51) Int. Cl.
*G06F 13/00* (2006.01)
*G06F 11/34* (2006.01)
*G06F 9/445* (2006.01)

(52) U.S. Cl.
CPC ............ *G06F 11/34* (2013.01); *G06F 11/3466* (2013.01); *G06F 2201/865* (2013.01); *G06F 8/61* (2013.01)
USPC .......................................... 719/328; 709/224

(58) Field of Classification Search
CPC ......................... H04L 29/08072; G06F 9/541
USPC ............................................ 719/328; 709/224
See application file for complete search history.

(56) References Cited

U.S. PATENT DOCUMENTS

| 8,135,827 B2* | 3/2012 | Wilson et al. ................. 709/224 |
| 8,457,108 B1* | 6/2013 | Croak et al. ................. 370/352 |
| 8,473,607 B2* | 6/2013 | Enscoe et al. ................. 709/224 |
| 8,713,157 B2* | 4/2014 | Dowling et al. .............. 709/224 |
| 2010/0057905 A1 | 3/2010 | Enscoe et al. |
| 2010/0125657 A1 | 5/2010 | Dowling et al. |
| 2010/0198879 A1* | 8/2010 | Flores et al. ................. 707/802 |

FOREIGN PATENT DOCUMENTS

| CN | 1852538 A | 10/2006 |
| CN | 101563672 A | 10/2009 |

* cited by examiner

*Primary Examiner* — Andy Ho
(74) *Attorney, Agent, or Firm* — Cheng-Ju Chiang

(57) ABSTRACT

The invention relates to a method or a device for obtaining a using-frequency of a specified application program. The method comprises: obtaining an installing route of the specified application program, according to a system-registering information list; calling an API to monitor operation of the specified application program; recording a last start-up time and the installing route of the specified application program; obtaining the last start-up time of the specified application program based on the installing route as an index; comparing the last start-up time and a current time, to determine the using-frequency of the specified application program. The present invention can intercept the process start functions of the Operation System, to easily and efficiently obtain the using-frequency of the specified application program, easily manage the application program installed in the computer, and provide the base for optimizing the Operation System of the computer.

14 Claims, 6 Drawing Sheets

| Name | Type | Data |
|---|---|---|
| (Default) | REG_SZ | (Default) |
| DisplayName | REG_SZ | Autodesk Express Viewer |
| DisplayVersion | REG_SZ | 3.1 |
| HelpLink | REG_SZ | http://www.autodesk.com/expressviewer-chs |
| InstallDate | REG_SZ | 2011-08-23 00:51:59 |
| InstallLocation | REG_SZ | C:\Program Files\Autodesk\Autodesk Express... |
| InstallSource | REG_SZ | D:\Autodesk AutoCAD 2004 简/繁体中文版\Bi... |
| Publisher | REG_SZ | Autodesk, Inc. |
| UninstallString | REG_SZ | C:\PROGRA~1\Autodesk\AUTODE~1\Setup.ex... |
| URLInfoAbout | REG_SZ | http://www.autodesk.com/expressviewer-chs |
| URLUpdateInfo | REG_SZ | http://www.autodesk.com/expressviewer-chs |

Figure 2

| Name | Type | Data |
|---|---|---|
| (Default) | REG_SZ | (Default) |
| DisplayIcon | REG_SZ | C:\WINDOWS\system32\Macromed\FlashUtil10w_ActiveX.exe |
| DisplayName | REG_SZ | Adobe Flash player 10 Activex |
| DisplayVersion | REG_SZ | 10.3.183.7 |
| EstimatedSize | REG_DWORD | 0x00001800(6144) |
| HelpLink | REG_SZ | http://www.adobe.com/flashplayer_support/ |
| NoModify | REG_DWORD | 0x00000001(1) |
| NoRepair | REG_DWORD | 0x00000001(1) |
| Publisher | REG_SZ | Adobe Systems Incorporated |
| RequiredESysF... | REG_SZ | 4,70,9,1155 |
| UninstallString | REG_SZ | C:\WINDOWS\system32\Macromed\Flash\FlashUtil10w_ActiveX.exe -maintain... |
| URLInfoAbout | REG_SZ | http://www.adobe.com |
| URLUpdateInfo | REG_SZ | http://www.adobe.com/getflashplayer/ |
| VersionMajor | REG_DWORD | 0x0000000a(10) |
| VersionMinor | REG_DWORD | 0x00000003(3) |

Figure 3

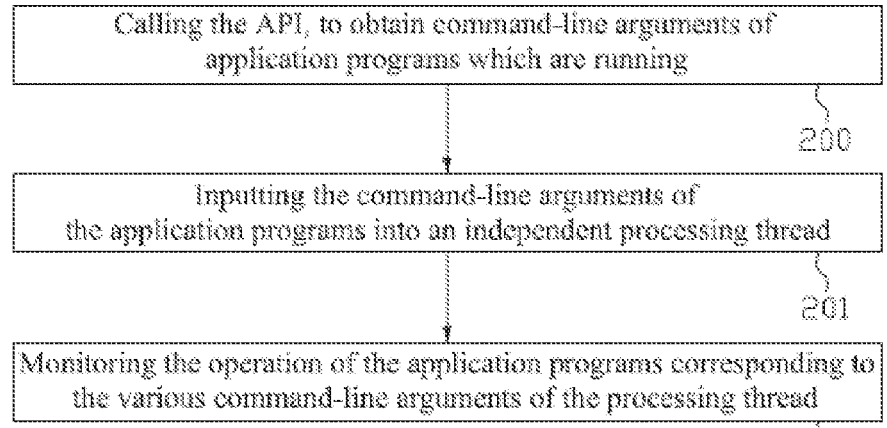

METHOD AND COMPUTER FOR OBTAINING USING-FREQUENCY OF APPLICATION PROGRAM

CROSS REFERENCE TO RELATED APPLICATIONS

The present application claims the priority of a Chinese patent application which was filed on Sep. 27, 2011, the application number of which is 201110296513.8. The present application is also a 35 U.S.C. §371 National Phase conversion of International (PCT) Patent Application No. PCT/CN2012/081150, filed on Sep. 7, 2012, the disclosure of which is incorporated by reference herein. The PCT International Patent Application was filed and published in English.

TECHNICAL FIELD

The present invention relates to the computer technology, and more particularly to a method and a device for obtaining a using-frequency of an application program.

BACKGROUND OF THE INVENTION

With the development of the computer technology, users may install various application programs in operation systems of computers, for satisfying various using needs of the users. For the various application programs, it is important to obtaining using-frequencies of the various application programs, such as to optimize the operation systems of the computers according to the using-frequencies of the various application programs.

Currently, install/uninstall list the operation systems of the Windows comes with, can judge the using-frequencies of the application programs, and the judgment thereof is performed according to easy algorithms. Thus the result thereof is not accurate, and it is difficult to obtain the real using-frequencies of the application programs, thus it cannot further provide a system optimization scheme for the users.

SUMMARY OF THE INVENTION

The embodiments of the present invention provides a method or a device for obtaining a using-frequency of an application program, which can accurately count the using-frequency of the application program installed in the Operation System of the computer, to really report the status of the user using the application program, for provide a system optimization scheme for the user.

An embodiment of the present invention provides a method for obtaining a using-frequency of a specified application program, comprising:

obtaining an installing route of the specified application program according to a system-registering information list;

calling an application programming interface (API), to monitor operation of the specified application program;

recording a last start-up time and the installing route of the specified application program;

obtaining the last start-up time of the application program based on the installing route as an index;

comparing the last start-up time of the application program and a current time, to determine the using-frequency of the application program.

Correspondingly, another embodiment of the present invention provides a device for obtaining a using-frequency of a specified application program, comprising:

a route-obtaining module, configured for obtaining an installing route of the specified application program according to a system-registering information list;

a program-monitoring module, configured for calling an application programming interface (API) to monitor operation of the specified application program;

an information-recording module, configured for recording a last start-up time and the installing route of the specified application program;

a time-obtaining module, configured for obtaining the last start-up time of the specified application program from the information-recording module, based on the installing route as an index;

a frequency-calculating module, configured for comparing the last start-up time and a current time, to determine the using-frequency of the application program.

The present invention can intercept the process start functions of the Operation System, to easily and efficiently obtain the using-frequency of the specified application program installed in the Operation System of the computer. Therefore, the present invention may easily manage the application program installed in the computer, and provide the base for optimizing the Operation System of the computer.

BRIEF DESCRIPTION OF THE DRAWINGS

To explain the technical solution provided by the embodiments of the present invention more clearly, the drawings used by the descriptions of the embodiments will be introduced briefly as follows. Obviously, the drawings described below are a plurality of embodiments of the present invention; those skilled in the art may further obtain other drawings according to these drawings on the premise of having no creative works.

FIG. 2 is a schematic view for obtaining an installing route of the specified application program in the method for obtaining the using-frequency of the specified application program in accordance with the first exemplary embodiment of the present invention;

FIG. 3 is another schematic view for obtaining an installing route of the specified application program in the method for obtaining the using-frequency of the specified application program in accordance with the first exemplary embodiment of the present invention;

FIG. 5 is a flow chart of the method for obtaining the using-frequency of the specified application program in accordance with a second exemplary embodiment of the present invention;

FIG. 6 is a flow chart of the method for obtaining the using-frequency of the specified application program in accordance with a third exemplary embodiment of the present invention;

EMBODIMENTS OF THE INVENTION

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a technology for obtaining a using-frequency of a specified application program, which can accurately count the using-frequency of the specified application program installed in the Operation System of the computer, for really reporting the status of the user using the specified application program, to provide a system optimization scheme for the user.

To clearly describe the exemplary embodiments of the present invention, the following firstly introduce technical terms involved in the exemplary embodiments of the present invention.

API (Application Programming Interface): are some predefined functions, for providing a capability of accessing a group of routines for application programs and developers based on certain software or hardware, without accessing source codes or understanding particulars of inner operating mechanism.

Process: is the basis of the operation system; is an application program which is processing; is a program instance which is operating in the computer; is able to be distributed to the processor (the CPU) and is an entity processed by the processor; is an action unit, which is performing to display in a single sequence, and described by a current status and a group of related system resources.

Hook: is a system mechanism provided by the Windows for replacing the interrupt under the DOS. After performing the hook for a specific system event, if a hooked event occurs, a program configured for hooking the event is informed by the system, thus the application program can respond to the event in the first period of time.

Application Program: is also called as "Application Software", and is software developed for a certain specific purpose. The application program may be a specific program, such as a photo browser. Alternatively, the application program also may be a set of a group of programs which are closely associated in function and cooperate with each other, such as the Office software. Alternatively, the application program also may be a large software system consisted of numerous independent programs, such as a database management system.

Figure 1:
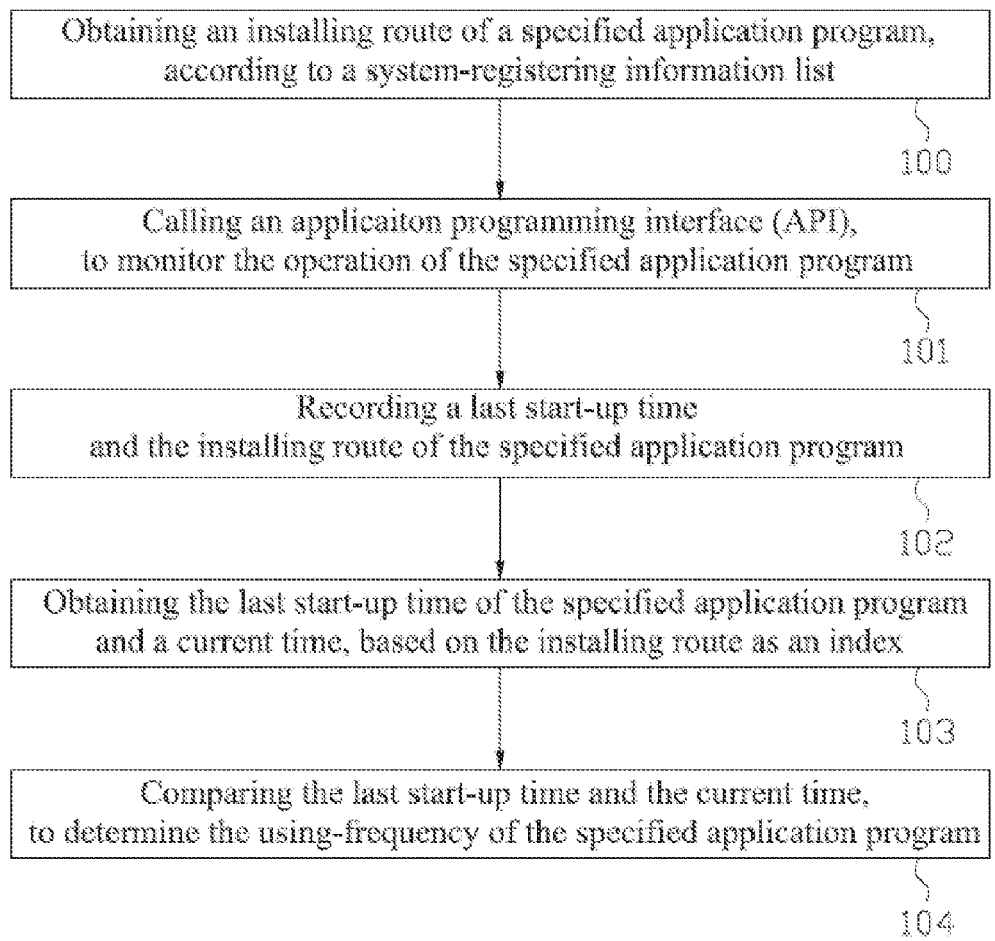
FIG. 1 is a flow chart of a method for obtaining a using-frequency of a specified application program in accordance with a first exemplary embodiment of the present invention.

FIG. 1 is a flow chart of a method for obtaining a using-frequency of a specified application program in accordance with a first exemplary embodiment of the present invention.

The method for obtaining the using-frequency of the specified application program provided in the exemplary embodiment of the present invention, comprises:

Step 100: obtaining an installing route of the specified application program, according to a system-registering information list;

Step 101: calling an API, to monitor the operation of the specified application program;

Step 102: recording a last start-up time and the installing route of the specified application program;

Step 103: obtaining the last start-up time of the specified application program and a current time, based on the installing route as an index;

Step 104: comparing the last start-up time and the current time, to determine the using-frequency of the specified application program.

The exemplary embodiment of the present invention uses the system-registering information list, to accurately obtain the installing route of the specified application program, and monitor start-up situations of the specified application program based on the installing route, such as to judge the using-frequency of the specified application program according to the recorded last start-up time. The method for obtaining the using-frequency of the specified application program provided in the exemplary embodiment of the present invention, is real and effective, impersonal and accurate, such that the user can distinctly know about the using status of the application program installed in the operation system of the computer. Furthermore, the user may further optimize the operation system of the computer according to the obtained using-frequency of the application program.

The step of obtaining the installing route of the specified application program according to the system-registering information list, may be performed by following modes:

A first mode: obtaining the installing route of the specified application program, according to an entry of a key being InstallLocation in the system-registering information list.

In detail, a program is called to obtain the installing route of the specified application program from the entry of the key being InstallLocation, which is under SOFTWARE\\Microsoft\\Windows\\Current Version\\Uninstall of the system-registering information list.

For example, FIG. 2 is a schematic view for showing all entries of the application program of "Autodesk Express Viewer" under SOFTWARE\\Microsoft\\Windows\\Current Version\\Uninstall of the system-registering information list. In FIG. 2, from the entry of the key being "InstallLocation", it can be seen that the installing route is "C:\Program Files\Autodesk\Autodesk Express Viewer".

A second mode: obtaining the installing route of the specified application program, according to an entry of a key being UnstallString in the system-registering information list.

In detail, some application programs do not have the entry of the key being "InstallLocation" in the system-registering information list. Therefore, the second mode is performed to call a program to read the entry of the key being UnstallString under SOFTWARE\\Microsoft\\Windows\\Current Version\\Uninstall of the system-registering information list, and then remove exe file name, to obtain the installing route of the application program.

For example, FIG. 3 is a schematic view for showing all entries of the specified application program of "Adobe Flash Player Activex" under "SOFTWARE\\Microsoft\\Windows\\Current Version\\Uninstall" of the system-registering information list. In FIG. 3, the entry of the key being "InstallLocation" does not existed. Thus, the entry of the key being "UnstallString" is found, which is presented as "C:\\WINDOWS\system32\Macromed\Flash\ FlashUtil10w_ActiveX.exe-maintain activex". Then it removes the exe file name, to obtain the installing route of "C:\WINDOWS\system32\Macromed\Flash\".

A third mode: fuzzily matching names of shortcuts of application programs with the name of the specified application program recorded in the system-registering information list, and if successfully matching a name of a shortcut of an application program with the name of the specified application program recorded in the system-registering information list, obtaining a directing route of the shortcut as the installing route of the specified application program.

In detail, some application programs not only do not have the entry of the key being "InstallLocation", but also do not have the entry of the key being "UnstallString" in the system-registering information list. Therefore, the present invention may further enumerate shortcuts of application programs, which may be in user desktop, start menu, or start shortcut, etc, and then fuzzily matching names of the shortcuts of the application programs with the name of the specified application program in the system-registering information list. If successfully matching, the present invention may regard the directing route of the shortcut as the installing route of the specified application program.

Figure 4:
FIG. 4 is other schematic view for obtaining an installing route of the specified application program in the method for obtaining the using-frequency of the specified application program in accordance with the first exemplary embodiment of the present invention.

For example, an operation system of a computer has installed application programs, such as "Tencent TM2009", "CHATM2010", "Windstorm Image Sound", etc, and shortcuts of the application programs are located in the user desktop, the start menu, or the start shortcut, etc., respectively. The exemplary embodiment will enumerate the shortcuts, then matching the names of the shortcuts with the name of the application program in the system-registering information. If a name of a shortcut is "CHATM2010" and it successfully matches with "CHATM trademark-querying software" in the system-registering information list when they fuzzily matches, the directing route of the shortcut is obtained, which is as shown in FIG. 4, and the directing route of the shortcut is "Target (T) C:\Rabbit\chatm\exe\Quety_net.exe". Then the directing route thereof is regarded as the installing route of the application program of "CHATM2010".

A fourth mode: fuzzily matching names of application programs of each project folder of each disk, with the name of the specified application program recorded in the system-registering information list, and if a name of an application program of a project folder of a disk is successfully matched with the name of the specified application program in the system-registering information list, regarding a route of the application program of the project folder of the disk as the installing route of the specified application program.

In detail, for some application programs, all of the above three modes cannot obtain the installing route thereof. Thus the fourth mode is used, to enumerate application programs of each folder under the project directory of Program Files of each disk, and match names of the application programs of each fold under the project directory of Program Files of each disk with the name in the system-registering information list. If a name of an application program of a fold under the project directory of Program Files of a disk is successfully matched with the name in the system-registering information list, the route of the application program of the project folder is regarded as the installing route of the specified application program.

For example, a folder named as "Movie Maker" exists in the folder of Program Files of C disk. If the name of "Movie Maker" is successfully matched with the name of the specified application program in the system-registering information list, the route of the application program of "Movie Maker" is "C:\Program Files\Movie Maker" and is regarded as the installing route of the specified application program.

For the software located in the directory of system, such as Application Verifier, Flash Player, it needs to use the exepath to match, and the method is similar with the above, which is not described herein.

It should be noted that, the exemplary embodiment may obtain the installing route in sequence from the first mode to the fourth mode. The exemplary embodiment of the present invention use the above four modes to obtain the installing route of the application program, thus it can furthest accurately obtain the installing route of the specified application program for analyze the using-frequency of the specified application program.

When or after obtaining the installing route of the specified application program, the exemplary embodiment of the present invention will call an API to monitor the operation of the specified application program.

Refer to FIG. 5, which is a flow chart of the method for obtaining the using-frequency of the specified application program in accordance with a second exemplary embodiment of the present invention.

The second exemplary embodiment will describe the flow of calling the API to monitor the operation of the specified application program in detail, which comprises:

Step 200: calling the API, and obtaining command-line arguments of application programs which are running In detail, the monitor of the API Create Process is firstly open. When the Create Process is called, the command-line arguments in the Create Process are obtained.

Step 201: inputting the command-line arguments of the application programs into an independent processing thread.

In detail, for not influencing the performance of calling the Create Process, the command-line arguments are inputted into an independent processing thread in the above Step 201.

Step 202: monitoring the operation of the application programs corresponding to the command-line arguments respectively.

The second exemplary embodiment provides the method for monitoring the various application programs, and the above monitoring mode can accurately obtain the status of the operation of the various application programs, to obtain the start-up time of the various application programs.

Refer to FIG. 6, which is a flow chart of the method for obtaining the using-frequency of the specified application program in accordance with a third exemplary embodiment of the present invention.

The third exemplary embodiment will describe of the process of how to obtaining the last start-up time of the application program and obtaining the using frequency thereof, which is described in following:

Step 300: obtaining the last start-up time of the specified application program from the processing thread and recording it.

In detail, the present invention monitors the various application programs in the processing thread, thus it can obtain the start-up time of any one specific application program. The exemplary embodiment only needs to record the last start-up time of the application programs. Tools for recording the start-up time thereof may be notepad or SQlite. It should be noted that, the SQlite is a light-duty database, and complies with the ACID-associated database managing system. The SQlite is embedded, and occupies little resource, and can support the main-trend Operation System, such as Windows or Linux or Unix, etc.

Step 301: performing a standardization process for the installing route.

In detail, installing routes obtained in the above modes of the present invention may be different in form. Thus the exemplary embodiment needs to perform the standardization process for the installing routes, thus they are quickly looked up and compared. The standardization process for the installing routes, comprises: unifying characters of the installing routes as lowercase characters; unifying names of the installing routes to comprise short file names, long file names, environment variables; standardizing the installing routes according to common-name rules. For example, the installing routes of "%system%" and "C:\windows\system32" should be uniformly standardized as "c:\windows\systems32\".

Step 302: recording the standardized installing route. In detail, the present invention may use the tools of Notepad or SQlite, to build an application-program information list, for recording last start-up time and installing routes of the various application programs, which are shown in table one:

| Application Program | Installing Route | Last Start-Up Time |
|---|---|---|
| Autodesk Express Viewer | C:\Program Files\Autodesk\Autodesk Express Viewer | 15:00, Sep. 8, 2011 |
| Adobe Flash Player Activex | C:\WINDOWS\system32\Macromed\Flash\FlashUtil10w_ActiveX.exe-matntain activex | 15:00, Jun. 8, 2011 |
| CHATM2010 | C:\Rabbit\chatm\exe\Quety_net.exe | 18:00, Mar. 20, 2011 |
| Movie Maker | C:\Program Files\Movie Maker | 17:30, Apr. 26, 2011 |

Step 303: obtaining the last start-up time of the specified application program according to the standardized installing routes as index.

In detail, the present invention uses the standardized installing routes of the above list as the index, to look up the last start-up time of the application program.

Step 304: comparing the last start-up time and the current time, to determine the using-frequency of the specified application program.

In detail, when obtaining the last start-up time of the specified application program, the exemplary embodiment compares it with the current time. If the period between the last start-up time and the current time is less than three days, it may determine the application program is often used. If the period between the last start-up time and the current time is less than seven days and more than three days, it may determine the application program is sometimes used. If the period between the last start-up time and the current time is less than thirty days and more than seven days, it may determine the application program is seldom used. If the period between the last start-up time and the current time is more than thirty days, it may determine the application program is never used.

It should be noted that, some application programs, such as the software of input method, the plug-in software, etc., which should be specifically processed, have not the exe files. For these application programs, the present invention should call the API Create Process to monitor the using statuses of the dll files, which is same with the above description for monitoring the exe files, and not described in following.

The method for obtaining the using-frequency of the application program of the present invention, can intercept the process start function of the system, to easily and efficiently obtain the using-frequency of the application program installed in the operation system of the computer. Therefore, the present invention may easily manage the application program installed in the computer, and may provide the base for optimizing the operation system of the computer.

Figure 7:
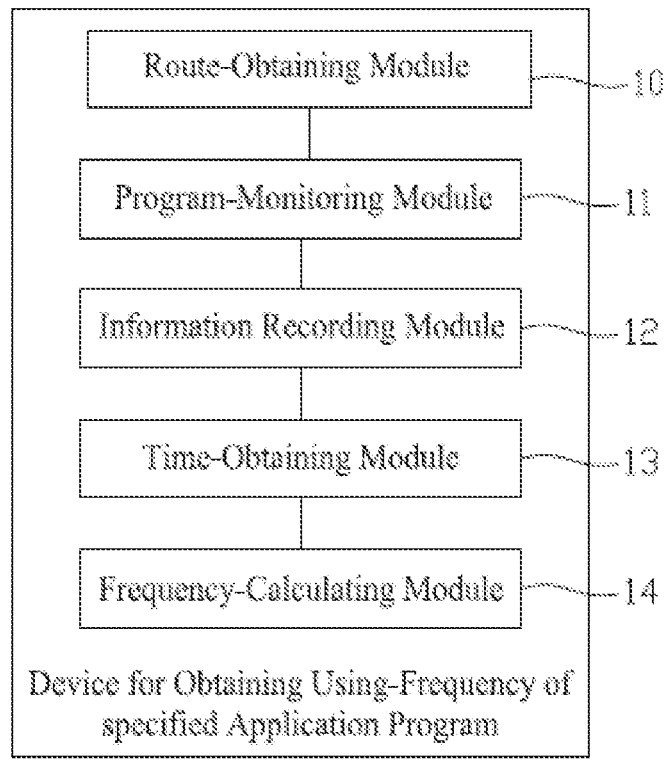
FIG. 7 is a schematic view of a device for obtaining a using-frequency of a specified application program in accordance with a first exemplary embodiment of the present invention.

FIG. 7 is a schematic view of a device for obtaining a using-frequency of a specified application program in accordance with a first exemplary embodiment of the present invention.

The device for obtaining the using-frequency of the specified application program provided in the exemplary embodiment of the present invention, comprises:

a route-obtaining module 10, configured for obtaining an installing route of the specified application program according to a system-registering information list;

a program-monitoring module 11, configured for calling an API, to monitor the operation of the specified application program;

an information-recording module 12, configured for recording a last start-up time and the installing route of the specified application program;

a time-obtaining module 13, configured for obtaining the last start-up time of the specified application program and the current time from the information-recording module, according to the installing route as an index;

a frequency-calculating module 14, configured for comparing the last start-up time of the specified application program and the current time, to determine the using-frequency of the application program.

The device of the exemplary embodiment of the present invention, accurately obtains the installing route of the specified application program according to the system-registering information list, and monitors the start-up situations of the application program based on the installing route, such as to judge the using-frequency of the application program according to the recorded last start-up time. The method for obtaining the using-frequency of the application program provided in the exemplary embodiment of the present invention, is real and effective, impersonal and accurate, such that the user can distinctly know about the using status of the application program installed in the operation system of the computer. Furthermore, the user may further optimize the operation system of the computer according to the obtained using-frequency of the application program.

Figure 8:
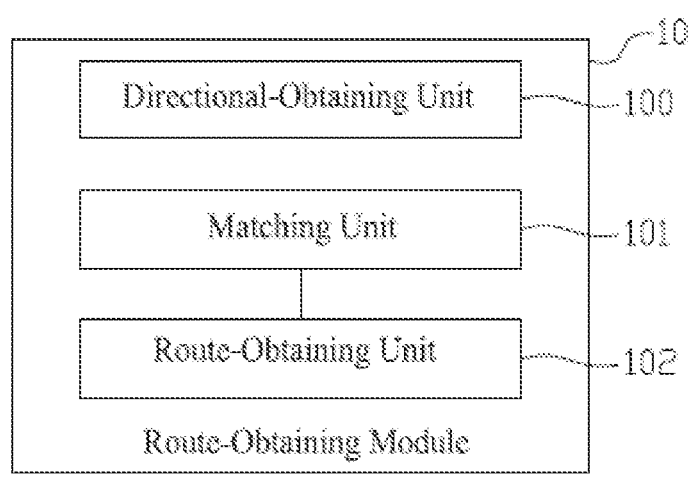
FIG. 8 is a schematic view of the device for obtaining the using-frequency of the specified application program in accordance with a second exemplary embodiment of the present invention.

FIG. 8 is a schematic view of the device for obtaining the using-frequency of the specified application program in accordance with a second exemplary embodiment of the present invention.

The exemplary embodiment will describe components of the route-obtaining module 10, which comprises: a directional-obtaining unit 100.

The directional-obtaining unit 100, is configured for obtaining the installing route of the specified application program, according to an entry of a key being InstallLocation in the system-registering information list, or obtaining the installing route of the specified application program, according to an entry of a key being UnstallString in the system-registering information list.

In detail, a program is called to obtain the installing route of the application program from the entry of the key being InstallLocation, which is under SOFTWARE\\Microsoft\\Windows\\CurrentVersion\\Uninstall of the system-registering information list.

For example, as shown in FIG. 2 which is a schematic view for showing all entries of the application program of "Autodesk Express Viewer" under SOFTWARE\\Microsoft\\Windows\\CurrentVersion\\Uninstall of the system-registering information list, from the entries of FIG. 2, the entry of the key being "InstallLocation" is found, to show the installing route is "C:\Program Files\Autodesk\Autodesk Express Viewer".

In addition, some application programs do not have the entry of the key being "InstallLocation" in the system-registering information list. Therefore, the second mode is performed to call a program to read the entry of the key being UnstallString under SOFTWARE\\Microsoft\\Windows\\Current Version\\Uninstall of the system-registering information list, and then remove exe file name, to obtain the installing route of the application program.

For example, as shown in FIG. 3 which is a schematic view for showing all entries of the application program of "Adobe Flash Player Activex" under "SOFTWARE\\Microsoft\\Windows\\Current Version\\Uninstall" of the system-registering information list, the entry of the key being "InstallLocation" does not existed. Thus, the entry of the key being "UnstallString" is found, which is presented as "C:\\WINDOWS\system32\Macromed\Flash\FlashUtil10w_ActiveX.exe-maintain activex". Then it removes the exe file name, to obtain the installing route of "C:\WINDOWS\system32\Macromed\Flash\".

The route-obtaining module 10 may further comprise a matching unit 101 and a route-obtaining unit 102.

The matching unit 101 is configured for fuzzily matching names of shortcuts of application programs with the name of the specified application program recorded in the system-registering information list, or fuzzily matching names of application programs of each project folder of each disk, with the name of the specified application program in the system-registering information list.

The route-obtaining unit 102 is configured for if successfully matching a name of a shortcut of an application program with the name of the specified application program recorded in the system-registering information list, obtaining a directing route of the shortcut as the installing route of the specified application program; or if successfully matching a name of an application program of a project folder of a disk with the name of the specified application program in the system-registering information list, regarding a route of the application program of the project folder of the disk as the installing route of the specified application program.

In detail, some application programs not only do not have the entry of the key being "InstallLocation", but also do not have the entry of the key being "UnstallString" in the system-registering information list. Therefore, the present invention may further enumerate shortcuts of application programs, which may be in user desktop, start menu, or start shortcut, etc, and then fuzzily matching names of the shortcuts of the application programs with the name of the specified application program in the system-registering information list by the matching unit 101. If successfully matching, the present invention may regard the directing route of the shortcut as the installing route of the specified application program.

For example, an operation system of a computer has installed application programs, such as "Tencent TM2009", "CHATM2010", "Windstorm Image Sound", etc, and shortcuts of the application programs are located in the user desktop, the start menu, or the start shortcut, etc., respectively. This step will enumerate the shortcuts, then matching the names of the shortcuts with the names of the application programs in the system-registering information. If a name of a shortcut is "CHATM2010" and it successfully matches with "CHATM trademark-querying software" in the system-registering information list when they fuzzily matches, the directing route of the shortcut is obtained, which is as shown in FIG. 4, and the directing route of the shortcut is "Target (T) C:\Rabbit\chatm\exe\Quety_net.exe". Then the directing route thereof is regarded as the installing route of the application program of "CHATM2010".

In addition, the matching unit 101 further fuzzily matches names of application programs of each project folder of each disk, with the name of the application program in the system-registering information list, and if a name of an application program of a project folder of a disk is successfully matched with the name of the application program in the system-registering information list, the route-obtaining unit 102 regards a route of the application program of the project folder of the disk as the installing route of the application program.

In detail, for some application programs, they should enumerate application programs of each folder under the project directory of Project Files of each disk. The matching unit 101 should match names of the application programs with the name of the application program of the system-registering information list. If successfully matching, the route-obtaining unit 102 regards a route of an application program of a project folder which matching with the name of the application program of the system-registering information list, as the installing route of the application program.

For example, a folder named as "Movie Maker" exists in the folder of Program Files of C disk. If the matching unit 101 successfully matches the name of "Movie Maker" with the name of the application program in the system-registering information list, the route-obtaining unit 102 regards the route of "C:\Program Files\Movie Maker" of the application program of "Movie Maker" as the installing route of the application program.

For the software located in the directory of system, such as Application Verifier, Flash Player, it needs to use the exepath to match, and the method is similar with the above, which is not described herein.

The route-obtaining module of the exemplary embodiment of the present invention may use the above four modes to obtain the installing route of the application program, thus it can furthest accurately obtain the installing route of the application program for analyze the using-frequency of the application program.

Figure 9:
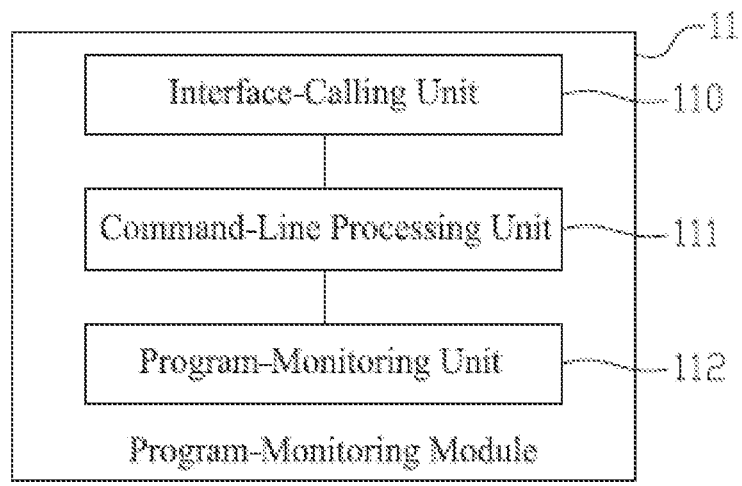
FIG. 9 is a schematic view for the device for obtaining the using-frequency of the specified application program in accordance with a third exemplary embodiment of the present invention.

FIG. 9 is a schematic view of the device for obtaining the using-frequency of the specified application program in accordance with a third exemplary embodiment of the present invention.

The exemplary embodiment will describe the program-monitoring module 11 of the present invention in detail, which comprises an interface-calling unit 110, a command-line processing unit 111 and a program-monitoring unit 112.

The interface-calling unit 110 is configured for calling the API to obtain command-line arguments of application programs which are running In detail, the monitor of the API Create Process of the interface-calling unit 110 is open. When the Create Process is called, the command-line arguments in the Create Process are obtained.

The command-line processing unit 111 is configured for inputting the command-line arguments of the application programs into an independent processing thread.

In detail, for not influencing the performance of calling the Create Process, the command-line processing unit 111 inputs the command-line arguments into an independent processing thread.

The program-monitoring unit 112 is configured for monitoring the operation of the application programs corresponding to the command-line arguments respectively.

The device of the exemplary embodiment may pre-monitor the running statuses of the various application programs, and the above monitoring mode can accurately obtain the status of the various application programs, to obtain the start-up time of the various application programs.

Figure 10:
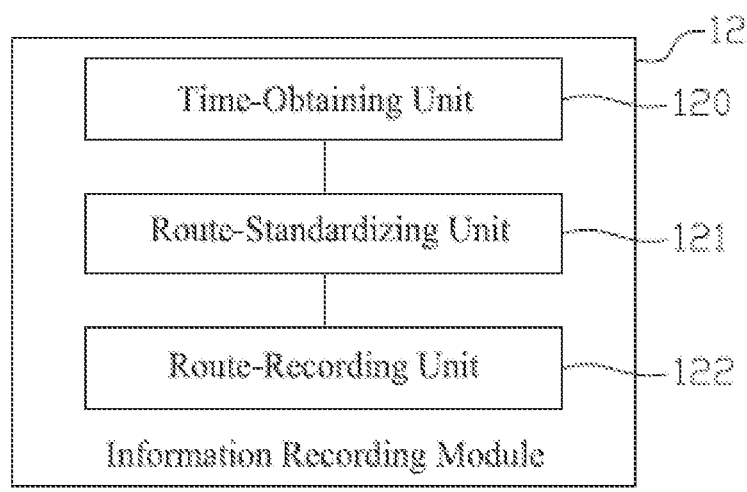
FIG. 10 is a schematic view for the device for obtaining the using-frequency of the specified application program in accordance with a fourth exemplary embodiment of the present invention.

FIG. 10 is a schematic view of the device for obtaining the using-frequency of the specified application program in accordance with a fourth exemplary embodiment of the present invention.

The exemplary embodiment will describe the components of the information recording module 12 and the functions thereof, which are described in following.

The information-recording module 12 comprises a time-recording unit 120. The time-recording unit 120 is configured for obtaining the last start-up time of the application program from the processing thread and recording it.

In detail, the program-monitoring unit 112 monitors the various application programs in the processing thread, and the time-recording unit 120 may obtain the start-up time of any one specific application program. In the exemplary embodiment, the time-recording unit 120 only needs to record the last start-up time of the application programs. In detail, the time-recording unit 120 may use notepad or SQlite to record the start-up time of the various application programs. It should be noted that, the SQlite is a light-duty database, and complies with the ACID-associated database managing system. The SQlite is embedded, and occupies little resource, and can support the main-trend Operation System, such as Windows or Linux or Unix, etc.

The information-recording module 12 may further comprise a route-standardizing unit 121 configured for performing a standardization process for the installing route.

In detail, installing routes obtained in the above modes of the present invention may be different in form. In the exemplary embodiment, the route-standardizing unit 121 needs to perform the standardization process for the installing routes, thus they are quickly looked up and compared. The standardization process for the installing routes, comprises: unifying characters of the installing routes as lowercase characters; unifying names of the installing routes to comprise short file names, long file names, environment variables; standardizing the installing routes according to common-name rules.

The information-recording module 12 may further comprise a route-recording unit 122 configured for recording the standardized installing route. In detail, the route-recording unit 122 may use the tools of Notepad or SQlite, to build an application-program information list, for recording the last start-up time and the installing routes of the various application programs, which are shown in table one.

The time-obtaining module 13 looks up the last start-up time of the application program under the installing route according to the installing route as the index, in the table one recorded by the route-recording unit 122.

The frequency-calculating module 14 is configured for comparing the last start-up time and the current time, to determine the using-frequency of the application program.

In detail, when the time-obtaining module 13 obtains the last start-up time of the application program, the frequency-calculating module 14 compares it with the current time. If the period between the last start-up time and the current time is less than three days, it may determine the application program is often used. If the period between the last start-up time and the current time is less than seven days and more than three days, it may determine the application program is sometimes used. If the period between the last start-up time and the current time is less than thirty days and more than seven days, it may determine the application program is seldom used. If the period between the last start-up time and the current time is more than thirty days, it may determine the application program is never used.

It should be noted that, some application programs, such as the software of input method, the plug-in software, etc., which should be specifically processed, have not the exe files. For these application programs, the present invention should call the API Create Process to monitor the using statuses of the dll files, which is same with the above description for monitoring the exe files, and not described in following.

The device for obtaining the using-frequency of the application program of the present invention, can intercept the process start function of the system, to easily and efficiently obtain the using-frequency of the application program installed in the operation system of the computer. Therefore, the device of the present invention may easily manage the application program installed in the computer, and may provide the base for optimizing the operation system of the computer.

Those skilled in the art may understand that, all or part of the processes in the methods of above-mentioned embodiments may be completed via related hardware instructed by the computer program. The program may be stored in a computer readable storage medium. When executing the program, the processes of above-mentioned method embodiments may be included. The storage medium may be disk, Compact Disc (CD), Read-Only Memory (ROM) or Random Access Memory (RAM), etc.

The aforementioned are only preferred embodiments of the present invention, which are not used for limiting the present invention. Any modifications, equivalent substitutions and improvements, made within the spirit and principle of the present invention, should be covered by the protection scope of the present invention.

What is claimed is:

1. A method for obtaining a using-frequency of a specified application program, executed by a computer, the method comprising:
   obtaining an installing route of the specified application program, according to a system-registering information list;
   calling an application programming interface (API), to monitor operation of the specified application program;
   recording a last start-up time and the installing route of the specified application program;
   obtaining the last start-up time of the specified application program based on the installing route as an index;
   comparing the last start-up time and a current time, to determine the using-frequency of the specified application program.

2. The method according to claim 1, wherein the step of obtaining the installing route of the specified application program according to the system-registering information list, comprises at least one of the following:
   obtaining the installing route of the specified application program, according to an entry of a key being InstallLocation in the system-registering information list;
   obtaining the installing route of the specified application program, according to an entry of a key being UnstallString in the system-registering information list;
   fuzzily matching names of shortcuts of application programs with name of the specified application program recorded in the system-registering information list, and if successfully matching a name of a shortcut of an application program with the name of the specified application program recorded in the system-registering information list, obtaining a directing route of the shortcut as the installing route of the specified application program;

fuzzily matching names of application programs of each project folder of each disk with the name of the specified application program recorded in the system-registering information list, and if successfully matching a name of an application program of a project folder of a disk with the name of the specified application program recorded in the system-registering information list, regarding a route of the application program of the project folder of the disk as the installing route of the specified application program.

3. The method according to claim 2, wherein the step of calling the API to monitor the operation of the specified application program, comprises:

calling the API, to obtain command-line arguments of application programs which are running;
inputting the command-line arguments of the application programs into an independent processing thread;
monitoring operation of the application programs corresponding to the various command-line arguments respectively.

4. The method according to claim 1, wherein the step of calling the API to monitor the operation of the specified application program, comprises:

calling the API, to obtain command-line arguments of application programs which are running;
inputting the command-line arguments of the application programs into an independent processing thread;
monitoring operation of the application programs corresponding to the various command-line arguments respectively.

5. The method according to claim 4, wherein the step of recording the last start-up time and the installing route of the specified application program, comprises:

obtaining the last start-up time of the specified application program from the processing thread and recording it;
performing a standardization process for the installing route of the specified application program;
recording the standardized installing route.

6. The method according to claim 5, wherein the step of performing the standardization process for the installing route, comprises:

unifying characters of the installing route as lowercase characters;
unifying names of the installing route to comprise short file names, long file names, and environment variables;
standardizing the installing route according to common-name rules.

7. A computer for obtaining a using-frequency of a specified application program, comprising a memory storing the following modules therein:

a route-obtaining module, configured for obtaining an installing route of the specified application program according to a system-registering information list;
a program-monitoring module, configured for calling an application programming interface (API) to monitor operation of the specified application program;
an information-recording module, configured for recording a last start-up time and the installing route of the specified application program;
a time-obtaining module, configured for obtaining the last start-up time of the specified application program from the information-recording module, based on the installing route as an index;
a frequency-calculating module, configured for comparing the last start-up time and a current time, to determine the using-frequency of the specified application program.

8. The computer according to claim 7, wherein the route-obtaining module comprises:

a directional-obtaining unit, configured for obtaining the installing route of the specified application program according to an entry of a key being InstallLocation in the system-registering information list; or obtaining the installing route of the specified application program according to an entry of a key being UnstallString in the system-registering information list.

9. The computer according to claim 8, wherein the route-obtaining module further comprises:

a matching unit, configured for fuzzily matching names of shortcuts of application programs, with the name of the specified application program recorded in the system-registering information list; or fuzzily matching names of application program of each project folder of each disk, with the name of the specified application program in the system-registering information list;
a route-obtaining unit, configured for if successfully matching a name of a shortcut of an application program with the name of the specified application program recorded in the system-registering information list, obtaining a directing route of the shortcut as the installing route of the specified application program recorded in the system-registering information list; or if successfully matching a name of an application program of a project folder of a disk with the name of the specified application program in the system-registering information list, regarding a route of the application program of the project folder of the disk as the installing route of the specified application program.

10. The computer according to claim 9, wherein the program-monitoring module comprises:

an interface-calling unit, configured for calling the API to obtain command-line arguments of application programs which are running;
a command-line processing unit, configured for inputting the command-line arguments of the application programs into an independent processing thread;
a program-monitoring unit, configured for monitoring operation of the application programs corresponding to the command-line arguments respectively.

11. The computer according to claim 8, wherein the program-monitoring module comprises:

an interface-calling unit, configured for calling the API to obtain command-line arguments of application programs which are running;
a command-line processing unit, configured for inputting the command-line arguments of the application programs into an independent processing thread;
a program-monitoring unit, configured for monitoring operation of the application programs corresponding to the command-line arguments respectively.

12. The computer according to claim 7, wherein the program-monitoring module comprises:

an interface-calling unit, configured for calling the API to obtain command-line arguments of application programs which are running;
a command-line processing unit, configured for inputting the command-line arguments of the application programs into an independent processing thread;
a program-monitoring unit, configured for monitoring operation of the application programs corresponding to the command-line arguments respectively.

13. The computer according to claim 12, wherein the information-recording module comprises:
- a time-recording unit, configured for obtaining the last start-up time of the specified application program from the processing thread and recording it;
- a route-standardizing unit, configured for performing a standardization process for the installing route;
- a route-recording unit, configured for recording the standardized installing route.

14. The computer according to claim 13, wherein the standardization process performed by the route-standardizing unit, comprises: unifying characters of the installing route as lowercase characters; unifying names of the installing route to comprise short file names, long file names, and environment variables; and standardizing the installing route according to common-name rules.

* * * * *